3,689,375
Patented Sept. 5, 1972

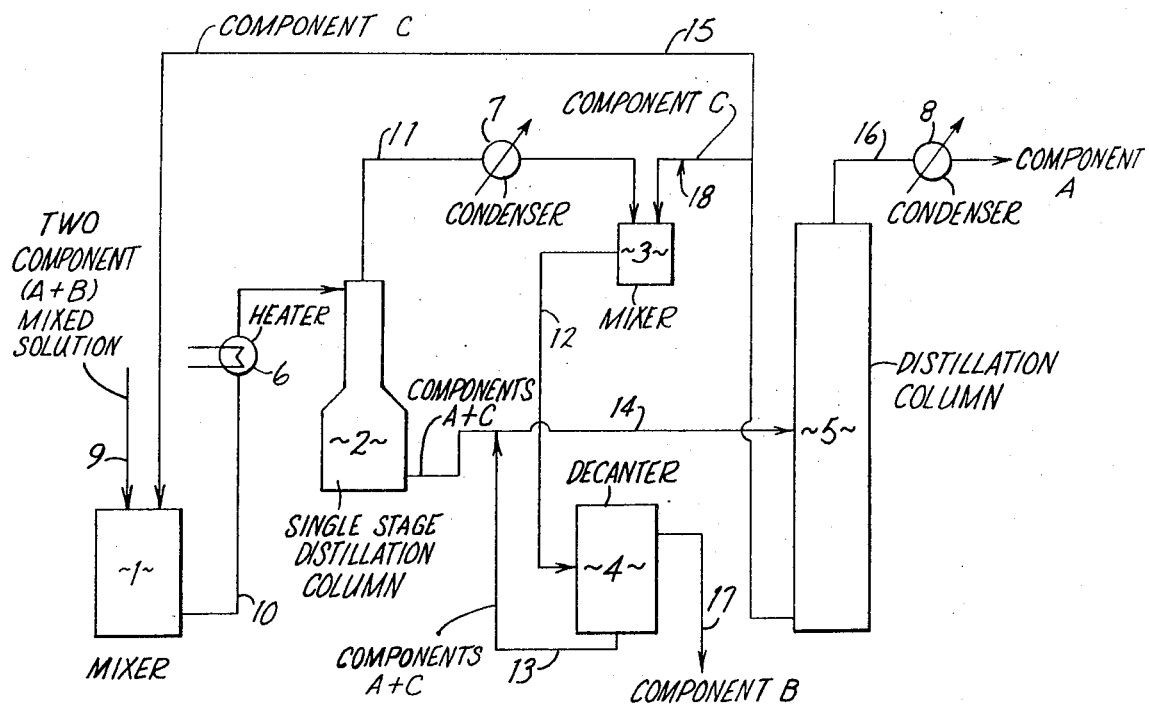

3,689,375
SEPARATING CLOSE BOILING, TWO COMPONENT MIXTURE BY DISTILLING IN PRESENCE OF SELECTIVE THIRD COMPONENT
Hideo Furukawa, Yoshihiro Kida, and Yosinori Kuroda, Osaka, Japan, assignors to Daicel Ltd., Osaka, Japan
Filed June 1, 1970, Ser. No. 41,937
Claims priority, application Japan, June 6, 1969, 44/44,502
Int. Cl. B01d 3/34
U.S. Cl. 203—95                                  6 Claims

ABSTRACT OF THE DISCLOSURE

A method of separating efficiently a liquid mixture consisting of two volatile components into its constituent components which comprises adding to the liquid mixture a third component having a sufficient solubility with the first volatile component but having little or no solubility with the second volatile component, the third component being added in an amount of at least 20% by weight of the total weight of all three components, and evaporating the mixture thereby to generate a gaseous phase having a relatively large amount of the second component in the early stage of evaporation and thus effect the separation. When phase separation occurs on addition of the third component, a phase consisting predominantly of the second component is removed and then the residual liquid is subjected to said evaporating operation.

BACKGROUND OF THE INVENTION

Field of the invention

This invention relates to a method of separating two volatile components from a mixture thereof by evaporation.

Description of the prior art

Generally, the separation of a mixed solution having two components has been effected by a chemical unit operation such as distillation, evaporation, liquid-liquid extraction, adsorption, salting out and the like. These unit operations have heretofore been extensively studied and good reports on the subject have been published. A number of inventions have been made on improvements of these operations. Hence, a mixed solution is now separated and refined by using a suitable unit operation or a suitable combination of two or more such unit operations selected depending on the nature of the mixed solution.

In general, a mixed solution having a small relative volatility or an azeotropic mixture having an azeotropic point cannot be separated by a mere distillation procedure. In such cases, the separation has been effected by an azeotropic distillation in which, with the use of an azeotropic (separating) agent as a third component, a new azeotropic mixture having an azeotropic temperature lower than the azeotropic temperature of the original mixture is formed to make the distillation and separation easy or by an extractive distillation in which a high boiling solvent is used as a third component so as to carry with it one of the two components into the bottom of the distillation column. These azeotropic distillation or extractive distillation operations should be carried out only after sufficient preliminary experimentation and prior to putting such operations into commercial practice. Much data is becoming available on the selection of the third component. But it is generally difficult to choose the third component in advance and the choice depends on experience or experiment. Furthermore, the gas-liquid equilibrium relation, which provides the basis for determining the number of plates in a distillation column, must necessarily be dependent only on an empirical calculating method, which requires actual measurements in practice. As another problem there is mentioned the separation of a condensed liquid flowing from the top of an azeotropic distillation column. When a single azeotropic distillation column is used, the separation of the condensed liquid requires the use of another azeotropic distillation, extractive distillation and other chemical operation. If two azeotropic distillation columns are used, the composition of the reflux liquids to the first column and the second column should be limited to a certain range in order to take out the first component from the first column and the second component from the second column with good purity. The same problem is encountered in the separation of a liquid at the column bottom in an extractive distillation column.

Considerable time and expense must be spent in preliminary experiments when azeotropic distillation or extractive distillation is to be performed.

SUMMARY OF THE INVENTION

It has now been found that, when a two-component mixed solution meets certain requirements, it can be separated into its constituent components by a very simple method. A first requirement is that each of the components of the mixed solution should have a differential solubility in a third component, that is, one component must be soluble in the third component and the other must be insoluble or only sparingly soluble therein. A second requirement is that said insoluble or sparingly soluble component must be present in such a small amount that it will not be able to be phase separated on addition of the third component. When a third component is added to a two-component mixed solution which meets these two requirements and then the three-component mixture is evaporated, substantially all of the insoluble or sparingly soluble component volatilizes together with some of the soluble component and some of the third component during the early stages of the evaporation and the soluble component remains in the evaporator, with good purity and without containing an appreciable amount of the insoluble or sparingly soluble component.

The first requirement depends inherently to some extent on the kinds of the two components which constitute the mixed solution and therefore, the method is not applicable to all two-component mixed solutions. But the method is applicable to a considerably wide range of mixed solutions provided that the proper choice of the third component is made. For instance, if the first component is a polar substance, such as an alcohol and a carboxylic acid, and the second component is a non-polar substance, such as a hydrocarbon compound, the first requirement can be met by using water, a polar substance, as the third component.

The term "two components" used in the present description and claims means two components having a difference in solubility in the third component and it does not necessarily mean that each component is a single compound.

In view of the first requirement, when the amount of the insoluble or sparingly soluble component in the mixture is large, the addition of the third component will naturally cause phase separation and the separated insoluble or sparingly soluble component can be removed easily by a simple liquid separation procedure. Then the evaporation can be carried out as above described.

The second requirement of the present invention does not means that such a separable liquid is separated as such, but rather means that the insoluble or sparingly soluble component is contained in the mixture in such a small amount that it cannot be removed by a simple liquid separation procedure. For example, the method of the invention can be applied to the recovery of a styrene monomer from an extract resulting from the extraction of a small amount of the styrene monomer, which remained in a styrenic polymer after the polymerization reaction, with methanol.

In case the addition of the third component to a two-component mixed solution which meets the first requirement causes phase separation, if it is subjected to a subsequent evaporating procedure without removing the separated insoluble component by a liquid separation procedure, the mixed solution cannot be separated efficiently into its constituent components and the advantages of the present invention cannot be obtained.

Usually, when the two-component mixed solution is phase separated by adding a third component, the phase-separated insoluble or sparingly soluble component cannot be removed completely by a liquid separation procedure and some of it remains in the mixed solution in the form of an emulsion or liquid drops. The presence of this much of an amount of excess phase-separated component, however, is not detrimental.

The foregoing two requirements must be met by two-component liquid mixtures separable by the use of the present invention. The boiling point of each component or its vapor pressure only affects the composition of the evaporated gaseous phase, but it does not essentially affect the process of the present invention.

The difference of solubility or compatibility between the first and third components as compared with that between the second and third components likewise affects the composition of the evaporated gaseous phase. The separation efficiencies are better and the second component (insoluble component) can be obtained with higher purity when this difference in solubility or compatibility is larger and the difference in vapor pressure between the first and second components is smaller or the second component has a higher vapor pressure. In the method of the present invention, therefore, the choice of the third component is important. But an abundance of data is available on the relative solubilities of components and those skilled in the art can readily select the third component. The most characteristic effect of the method of the present invention is that, even when the second component has a lower vapor pressure in a mixed solution consisting of the first component and the second component, the second component can be first evaporated and separated.

The method of the present invention can also be applied advantageously to the separation of an azeotropic mixture of two components having close boiling points. This has required a special distillation procedure according to the conventional method.

The mechanism of the method of the present invention is not clear, but it is surmised from the foregoing facts that, in a system containing large quantities of two compatible components (that is to say, the first and third components) and a small quantity of a component (the second component) which is compatible with one of these components (the first component) but is not with the other component (the third component), the vapor pressure of such minor (second) component will rise extraordinarily.

In other words, if the vapor pressure of the second component of a mixed solution consisting of the first and second components is low, but a third component is present in a large amount compared to that of the second component, the partial pressures of both the first and third components decreases because of the compatibility between them and the partial pressure of the second component which is inferior in compatibility increases. Hence, the smaller is the compatibility or solubility between the second component and the first or third component, the more the partial pressure goes up and the better the separation efficiency becomes; and the amounts of the first and third components entrained in the second component on evaporation become smaller.

Accordingly, the present invention depends greatly on the selection of the third component, but is applicable to all combinations which meet the above-mentioned requirements. The invention is not limited to combinations of specific substances.

In the practice of the method of the present invention, a third requirement is to add the third component in an amount of at least 20% by weight of the combined weight of the first through third components. If the amount of the third component is less than 20%, an effective separation cannot be performed. Larger amounts of the third component provide a better efficiency of separating the second component, but the actual amount of the third component should be determined by taking into consideration the difficulty of separating the first component from the mixture of the remaining first and third component after the evaporation. Usually, it is preferred to use about 50% to 70% by weight of the third component, based on the total weight of the first, second and third components.

A fourth requirement of the method of the invention is to subject the mixture of the two-component mixed solution and the third component to an evaporation procedure. Evaporation here means simple distillation of the mixture, bubbling of steam, air or other gas through the mixture of merely leaving the mixture to stand in the open air. A multi-stage distillation generally results in bad efficiency because of a decrease in the concentration of the second component in the distillate. However much the same result can be produced if distillation is conducted in two or three stages.

BRIEF DESCRIPTION OF THE DRAWING

The method of the invention will be specifically described with reference to the accompanying drawing which is a flowsheet showing one embodiment for carrying out the method of the invention on a continuous basis.

DESCRIPTION OF THE PREFERRED EMBODIMENT

A two-component mixed solution consisting of a component A and a component B is introduced from a conduit 9 into a mixing vessel 1. A predetermined amount of component C as a third component is added through a pipe 15 which connects the mixing vessel 1 with a distillation column 5. Component B is placed in an insoluble or sparingly soluble state to components A and C by this addition. A mixed solution of these three components is fed through a pipe 10 and a heater 6 into the top of a single-stage distillation column 2. In the single-stage distillation column 2, the mixed solution is treated by heating or blowing of nitrogen gas into the bottom thereof, whereby a predetermined amount of the fed liquid is distilled out through a pipe 11 provided near the column top.

The distillate is condensed in a condenser 7 and it contains substantially the entire amount of component B fed into the system and a part of component A and component C. The distillate from the column top enters a mixing vessel 3. An additional quantity of component C is fed into the mixer 3 through a pipe 18 which connects the mixing vessel 3 and the distillation column 5. In the mixer 3, the component C is mixed with the distillate from column 2 in order to equalize the ratio of component C to component A in this distillate with the corresponding ratio in the mixing vessel 1. The mixed solution in the mixing vessel 3 enters a decanter 4 through a pipe 12. In the decanter, component B generally becomes an upper layer and is taken out through a pipe 17.

The liquid coming from the bottom of the single-stage distillation column 2 is a mixed solution of components A and C free from component b. It is mixed with the liquid taken out from the lower layer in the decanter 4 by a discharge pipe 13. The mixture of components A and C is fed through a pipe 14 into the distillation column 5. The mixed solution of components A and C can be separated in the column 5 with relative ease by a distillation procedure. Generally, component A as a low-boiling substance comes from the top of the column and is taken out through a pipe 16 after being cooled by a condenser 8. Component C is taken out as a high-boiling substance from the bottom of the column and is recycled to the mixing vessels 1 and 3 through the pipes 15 and 18.

The present invention is widely applicable to the removal of minor amounts of by-products in a reaction product or the removal or recovery of minor amounts of washings or extracts occurring in such operations as washing and extraction. But it is advantageously applied with excellent results to azeotropic mixtures which are difficult to separate by conventional methods. Furthermore, since an evaporation procedure by heat is not essential in the present invention, a mixture containing thermally unstable compounds or heat-polymerizable compounds can be separated by being left standing at room temperature in the open air or by bubbling an unheated gas therethrough.

Illustrative examples of the invention will be given below, but it will be understood that the method of the invention is not limited to these examples.

Example 1.—To a mixture of 98% methanol and 2% styrene was added water in an amount twice as large as the weight of the methanol. The mixed solution was flushed from the top of a simple distillation column at 80° C. and 2% of the fed mixed liquid was distilled out. The distillate was a mixed solution of methanol, water and styrene. Decantation of the distillate resulted in the recovery of styrene at a yield of more than 98%. The concentration of styrene in the liquid from the bottom of the distillation column was less than 30 p.p.m., and the ratio of water to methanol was 72:28. The liquid was separated into methanol and water by means of a distillation column. The recovery yield of methanol was 99.5%, and that of styrene was 98.5%.

Example 2.—The same three-component mixture of methanol, water and styrene as used in Example 1 was fed into a single-stage distillation column at room temperature and nitrogen gas was blown from the bottom of the column in the same manner as in Example 1. The concentration of styrene in the liquid from the bottom of the distillation column was 20 p.p.m.

Example 3.—To a two-component mixture consisting of 95% of glacial acetic acid and 5% of toluene was added water as a third component in an amount twice as large as the weight of the glacial acetic acid. The mixed solution was fed at 90° C. to the top of a simple distillation column. Steam was blown from the bottom of the column so as to distill out 5% of the fed liquid. The concentration of toluene in the liquid from the bottom of the column was less than 30 p.p.m.

Example 4.—The procedure of Example 3 was repeated except using acetone in place of glacial acetic acid and hexane in place of toluene. The hexane concentration of the liquid at the bottom of the column was less than 30 p.p.m.

Example 5.—The procedure of Example 1 was repeated except using a high-boiling substance such as lauryl alcohol, machine oil, octanol or furfural instead of styrene in Example 1. The same results as in the case of using styrene were obtained.

It is seen from the results of Examples 1 to 5 that, according to the present invention, the relative volatility was increased by the addition of a third component and component A and component B are readily separable from each other at low temperatures.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A method for separating a first volatile liquid component selected from the group consisting of methanol, acetone, and glacial acetic acid, from a second volatile liquid component selected from the group consisting of styrene, toluene, hexane, lauryl alcohol, machine oil, octanol and furfural, and wherein said first and second liquid components have a small relative volatility and/or form an azeotropic mixture, which comprises the steps of:

adding to said starting mixture a third liquid component which is substantially soluble with said first component and which is substantially insoluble with said second component, and obtaining a substantially single phase liquid mixture of said three components in which the amount of said second component in said mixture is minor compared with said first component and is insufficient to cause phase separation of said second component from said three-component mixture and in which the partial vapor pressure of said second component is increased relative to its partial vapor pressure in said starting mixture, said three-component mixture containing at least 20% by weight of said third component;

feeding said three-component mixture into a distillation vessel and therein effecting partial vaporization of said three-component mixture sufficient to remove substantially all of said second component as the vapor phase, removing the vapor from contact with the liquid as the vapor is formed and discharging completely said vapor from said vessel before condensation to obtain a separated vapor phase containing a relatively large proportion of said second component and a liquid phase substantially free of said second component.

2. A method according to claim 1 wherein the first component of the liquid mixture is methanol, the second component is styrene and the third component is water.

3. A method according to claim 1 wherein the first component of the liquid mixture is glacial acetic acid, the second component is toluene and the third component is water.

4. A method according to claim 1 wherein the first component of the liquid mixture is acetone, the second component is hexane and the third component is water.

5. A method according to claim 1, including the steps of adding said third component to a liquid mixture consisting essentially of said first and second components to form a three-component mixture, separating any phase that forms consisting predominantly of said second component from said three-component mixture and subjecting the remainder of the three-component mixture to said partial vaporization operation.

6. A method according to claim 1, including the additional steps of condensing said vapor phase, mixing the condensate with an additional amount of said third component, then mixing the condensate and third component with a portion of the liquid phase from the vessel, decanting the second component and then distilling the remainder to recover separately the first and third components.

References Cited

UNITED STATES PATENTS

| | | | |
|---|---|---|---|
| 2,751,337 | 6/1956 | Goddin et al. | 203—96 X |
| 1,929,901 | 10/1933 | Ricard et al. | 203—96 X |
| 3,438,868 | 4/1969 | Sawaki et al. | 203—96 X |
| 2,434,322 | 1/1948 | Latchum et al. | 203—96 X |
| 2,179,991 | 11/1939 | Bright et al. | 203—96 X |
| 2,582,299 | 1/1952 | Vaughan et al. | 260—486 |
| 3,329,585 | 7/1967 | Huxtable | 203—95 X |

FOREIGN PATENTS

| | | | |
|---|---|---|---|
| 877,360 | 9/1961 | Great Britain | 203—96 |

NORMAN YUDKOFF, Primary Examiner

D. EDWARDS, Assistant Examiner

U.S. Cl. X.R.

203—39, 71; 260—541, 593, 643, 669 A, 676